(12) United States Patent
Nakayama

(10) Patent No.: US 8,926,428 B1
(45) Date of Patent: Jan. 6, 2015

(54) SERVER, PROGRAM, AND METHOD FOR PROVIDING INTERACTIVE GAME

(71) Applicant: DeNA Co., Ltd., Tokyo (JP)

(72) Inventor: Taiga Nakayama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/074,539

(22) Filed: Nov. 7, 2013

(30) Foreign Application Priority Data

Oct. 25, 2013 (JP) ................................. 2013-222103

(51) Int. Cl.
*A63F 9/24* (2006.01)
*A63F 13/00* (2014.01)
*G06F 17/00* (2006.01)
*G06F 19/00* (2011.01)
*A63F 13/30* (2014.01)

(52) U.S. Cl.
CPC ..................................... *A63F 13/12* (2013.01)
USPC ............................................. 463/31; 463/42

(58) Field of Classification Search
CPC .............................................. A63F 2300/807
USPC ...................................................... 463/31, 42
See application file for complete search history.

(56) References Cited

FOREIGN PATENT DOCUMENTS

JP 2007-185315 7/2007
JP 2011-036510 2/2011

OTHER PUBLICATIONS

Isospeedrix, "Nexus Wars" changelog, http://us.battle.net/sc2/en/forum/topic/2211923600, Mar. 10, 2011.*
FinalLevelGames, "Nexus Wars" gameplay video, https://www.youtube.com/watch?v=LfUB3bWsTBo, Jan. 7, 2012.*
Capocal, "Nexus Wars" strategy guide, http://www.teamliquid.net/forum/sc2-maps/306535-nexus-wars-comprehensive-strategy-guide, Jan. 26, 2012.*
Japanese Office Action in connection with Japanese Patent Application No. 2013-222103 mailed on Dec. 3, 2013.
Complete Guide of Valkyria Chronicles 3, Enterbrain, Inc., Apr. 8, 2011, First Edition, pp. 30-35.

* cited by examiner

*Primary Examiner* — Kevin Y Kim
(74) *Attorney, Agent, or Firm* — Pillsbury Winthrop Shaw Pittman LLP

(57) ABSTRACT

The server according to an embodiment provides interactive games that use characters moving on a route and require more strategies. The server is configured to execute an interactive-game program including a screen display module for display a game screen, a first placement module for placing the characters selected by the players on the routes before a predetermined starting condition is satisfied, a movement module for moving the characters toward the bases of the opponent after the predetermined starting condition is satisfied, a second placement module for placing the characters selected by the players on the routes after a predetermined starting condition is satisfied, a battle process module for performing a battle process when the distance between the characters falls within a predetermined range, an occupation process module for performing an occupation process, and a determination module for determining a result of the interactive game.

11 Claims, 12 Drawing Sheets

Character Management Table

| Game Field ID |
| --- |
| Player ID |
| Character ID |
| HP |
| Cost |
| Character Attribute |
| Offense Power |
| Attack Range |
| Moving Power |
| ... |

Fig. 3

Base Management Table

| Game Field ID |
|---|
| Player ID |
| Base ID |
| HP |
| Defense Power |
| ... |

Fig. 4

SERVER, PROGRAM, AND METHOD FOR PROVIDING INTERACTIVE GAME

CROSS-REFERENCE TO RELATED APPLICATIONS

This application is based on and claims the benefit of priority from Japanese Patent Application Serial No. 2013-222103 (filed on Oct. 25, 2013), the contents of which are hereby incorporated by reference in their entirety.

TECHNICAL FIELD

The present invention relates to a server, program, and method for providing an interactive game, and particularly to a server, program, and method for providing an interactive game between a first player and a second player by executing a program.

BACKGROUND

Conventionally, there are known tower defense games wherein enemy characters move on a route from a starting point to a goal and a player places objects such as weapons on the route to prevent the enemy characters from moving toward the goal, thereby to fulfill the game target (see, e.g., Japanese Patent Application Publication No. 2011-036510 (paragraph 0088)). Also, there are known tower offense games wherein a player moves an ally character from a starting point to a goal while beating enemy characters present on the route, thereby to fulfill the game target.

SUMMARY

However, in such games, a player is involved in only one of defense and offense; therefore, such games tend to progress monotonically and do not require sufficient strategy. Accordingly, games requiring more strategies are desired as interactive games that use characters moving on a route.

One object of the embodiments of the present invention is to provide interactive games that use characters moving on a route and require more strategies. Other objects of the present disclosure will be apparent with reference to the entire description in this specification.

The server according to an embodiment of the present invention is a server for providing an interactive game between a first player and a second player by executing a program, the server comprising: one or more computer processors configured to execute the program, wherein the program comprises: a screen display module configured to display a game screen on display devices of the first player and the second player in accordance with progress of the interactive game, the game screen including at least a part of a route area having a plurality of routes each provided with bases of the first player and the second player; a first placement module configured to place one or more characters selected by the players from a plurality of characters selectable to the players, on one or more routes selected by the players from the plurality of routes, before a predetermined starting condition is satisfied; a movement module configured to move the characters placed on the routes toward the bases of the opponent along the routes after the predetermined starting condition is satisfied; a second placement module configured to place one or more characters selected by the players from a plurality of characters selectable to the players, on one or more routes selected by the players from the plurality of routes, after the predetermined starting condition is satisfied; a battle process module configured to perform a battle process when a distance between the character of the first player and the character of the second player on the route falls within a predetermined range, resume the movement of the character winning in the battle process toward the base of the opponent, and stop the movement of the character losing in the battle process toward the base of the opponent; and a determination module configured to determine a result of the interactive game based at least on the characters reaching the bases of the opponent. The "characters" above include various electronic elements, objects, contents, etc. used in interactive games.

As is obvious from the above description, the server according to an embodiment of the present invention causes one or more computer processors to execute the above and below-described modules, thereby to serve as: a screen display unit configured to display a game screen on display devices of the first player and the second player in accordance with progress of the interactive game, the game screen including at least a part of a route area having a plurality of routes each provided with bases of the first player and the second player; a first placement unit configured to place one or more characters selected by the players from a plurality of characters selectable to the players, on one or more routes selected by the players from the plurality of routes, before a predetermined starting condition is satisfied; a movement unit configured to move the characters placed on the routes toward the bases of the opponent along the routes after the predetermined starting condition is satisfied; a second placement unit configured to place one or more characters selected by the players from a plurality of characters selectable to the players, on one or more routes selected by the players from the plurality of routes, after the predetermined starting condition is satisfied; a battle process unit configured to perform a battle process when a distance between the character of the first player and the character of the second player on the route falls within a predetermined range, resume the movement of the character winning in the battle process toward the base of the opponent, and stop the movement of the character losing in the battle process toward the base of the opponent; and units configured to perform other processes describe herein.

The program according to an embodiment of the present invention is a program for causing one or more computers to serve as a system for providing an interactive game between a first player and a second player, the program comprising: a screen display module configured to display a game screen on display devices of the first player and the second player in accordance with progress of the interactive game, the game screen including at least a part of a route area having a plurality of routes each provided with bases of the first player and the second player; a first placement module configured to place one or more characters selected by the players from a plurality of characters selectable to the players, on one or more routes selected by the players from the plurality of routes, before a predetermined starting condition is satisfied; a movement module configured to move the characters placed on the routes toward the bases of the opponent along the routes after the predetermined starting condition is satisfied; a second placement module configured to place one or more characters selected by the players from a plurality of characters selectable to the players, on one or more routes selected by the players from the plurality of routes, after the predetermined starting condition is satisfied; a battle process module configured to perform a battle process when a distance between the character of the first player and the character of the second player on the route falls within a predetermined range, resume the movement of the character winning in the battle process toward the base of the opponent, and stop the movement of the character losing in the battle process toward the base of the opponent and a determination module configured to determine a result of the interactive game based at least on the characters reaching the bases of the opponent.

The method according to an embodiment of the present invention is a method using one or more computers for providing an interactive game between a first player and a second player, the method comprising the steps of: displaying a game screen on display devices of the first player and the second player in accordance with progress of the interactive game, the game screen including at least a part of a route area having a plurality of routes each provided with bases of the first player and the second player; placing one or more characters selected by the players from a plurality of characters selectable to the players, on one or more routes selected by the players from the plurality of routes, before a predetermined starting condition is satisfied; moving the characters placed on the routes toward the bases of the opponent along the routes after the predetermined starting condition is satisfied; placing one or more characters selected by the players from a plurality of characters selectable to the players, on one or more routes selected by the players from the plurality of routes, after the predetermined starting condition is satisfied; performing a battle process when a distance between the character of the first player and the character of the second player on the route falls within a predetermined range, resume the movement of the character winning in the battle process toward the base of the opponent, and stop the movement of the character losing in the battle process toward the base of the opponent; and determining a result of the interactive game based at least on the characters reaching the bases of the opponent.

Various embodiments of the present invention provide interactive games that use characters moving on a route and require more strategies.

BRIEF DESCRIPTION OF THE DRAWINGS

FIG. 3 is a diagram showing an example of data items managed by a character management table according to an embodiment.

FIG. 4 is a diagram showing an example of data items managed by a base management table according to an embodiment.

DESCRIPTION OF EXAMPLE EMBODIMENTS

Figure 1:
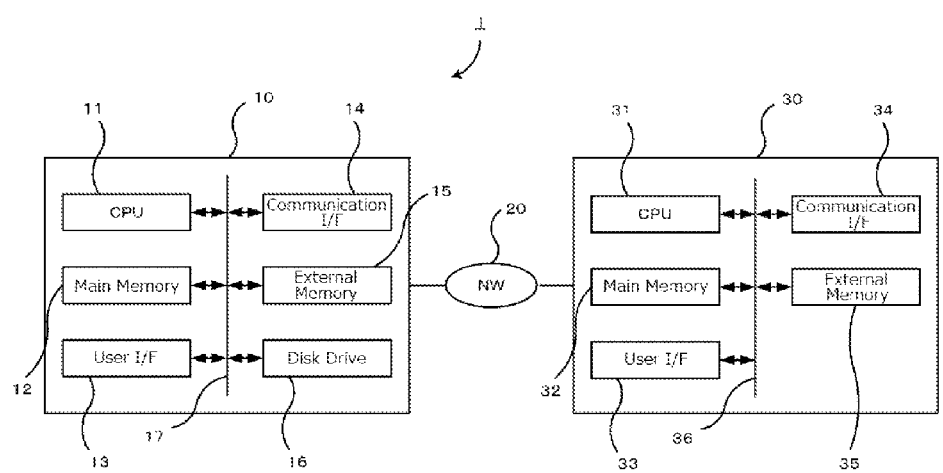
FIG. 1 is a block diagram schematically illustrating a system including a server according to an embodiment of the present invention.

FIG. 1 is a block diagram schematically illustrating the configuration of a system 1 including a server 10 according to an embodiment of the present invention. As shown in FIG. 1, the server device 10 according to an embodiment may be communicatively connected via a communication network 20 such as the Internet to a terminal device 30 configured as a conventional computer, and may provide various games to a user operating the terminal device 30. Additionally, the server 10 may be communicatively connected to terminal devices other than the terminal device 30 and not shown. The server 10 may provide various digital contents other than games to the user operating the terminal device 30, provide various Internet services other than provision of digital contents, and provide a platform service that implements various communications between a plurality of users operating a plurality of terminal devices 30.

As shown, the server 10 may include a central processing unit (CPU) (computer processor) 11, a main memory 12, a user interface (I/F) 13, a communication I/F 14, an external memory 15, and a disk drive 16, and these components may be electrically connected to one another via a bus 17. The CPU 11 may load an operating system and various programs such as control programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The various data that may be stored in the external memory 15 may also be stored on a database server communicatively connected to the server 10 and physically separate from the server 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, a game application and data such as game data stored in a storage medium may be read by the disk drive 16, and may be installed into the external memory 15.

In an embodiment, the server 10 may be a web server for managing a web site including a plurality of hierarchical web pages and may be capable of providing the terminal devices 30 with game services. The terminal devices 30 may fetch HTML data for rendering a web page from the server 10 and analyze the HTML data to present the web page to a user (a player of the game) of the terminal devices 30. A game provided through such a web page is sometimes called a browser game. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server 10 may be received by the terminal device 30 through a communication I/F 34 in accordance with the control of CPU 31; the received game programs may be sent to an external memory 35 and stored thereon. The application software may be launched in accordance with the user's operation on the terminal device 30 and may be executed on a platform implemented on the terminal device 30 such as NgCore™ or Android™. The server 10 may provide the game applications executed on the terminal devices 30 with various data required for progression of the games. Additionally, the server 10 can store various data sent from the terminal device 30 for each user, thereby managing the progression of the game for each user.

Thus, the server 10 may manage the web site for providing game services and deliver web pages constituting the web site in response to a request from the terminal device 30, thereby progressing the game. Also, the server 10 can progress a game by communicating with a game application performed on the terminal device 30 in place of, or in addition to, such a browser game. Whichever mode may be taken to provide the game, the server 10 can store data required to progress the game for each identification identifying a user. Briefly, the server 10 may also include a function to authenticate a user at start of the game and perform charging process in accordance with progression of the game. The games provided by the server 10 includes desired games such as simulation games, action games, role playing games, interactive sports games, and card games. The types of the games implemented by the web site or game applications of the server 10 are not limited to those explicitly described herein.

In an embodiment, the terminal device 30 may be any information processing device that may display on a web browser a web page of a game web site obtained from the server 10 and include an application executing environment for executing game applications; and the terminal devices 30 may include smartphones, tablet terminals, and game-dedicated terminals.

As shown, the terminal device 30 may include a central processing unit (CPU) (computer processor) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include an information input device for receiving user inputs and an information output device for outputting an operation result of CPU 31; and the user I/F may include a display device such as a liquid crystal display having a touch panel.

The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The external memory 35 may comprise, for example, a magnetic disk drive or a flash memory and store various programs such as an operating system. When receiving a game application from the server 10 via the communication I/F 34, the external memory 35 may store the received game application.

A terminal device 30 having such an architecture may include, for example, browser software for interpreting an HTML file (HTML data) and rendering a screen; this browser software may enable the terminal device 30 to interpret the HTML data fetched from the server 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the server 10 a SWF file embedded in HTML data and execute the SWF file by using the browser software and the plug-in software.

When a game is executed on the terminal device 30, for example, animation or an operation icon designated by the program may be displayed on a screen of the terminal device 30. The user may enter an instruction for progressing the game using an input interface of the terminal device 30. The instruction entered by the user may be transmitted to the server 10 through the browser of the terminal device 30 or a platform function such as NgCore™.

Figure 2:
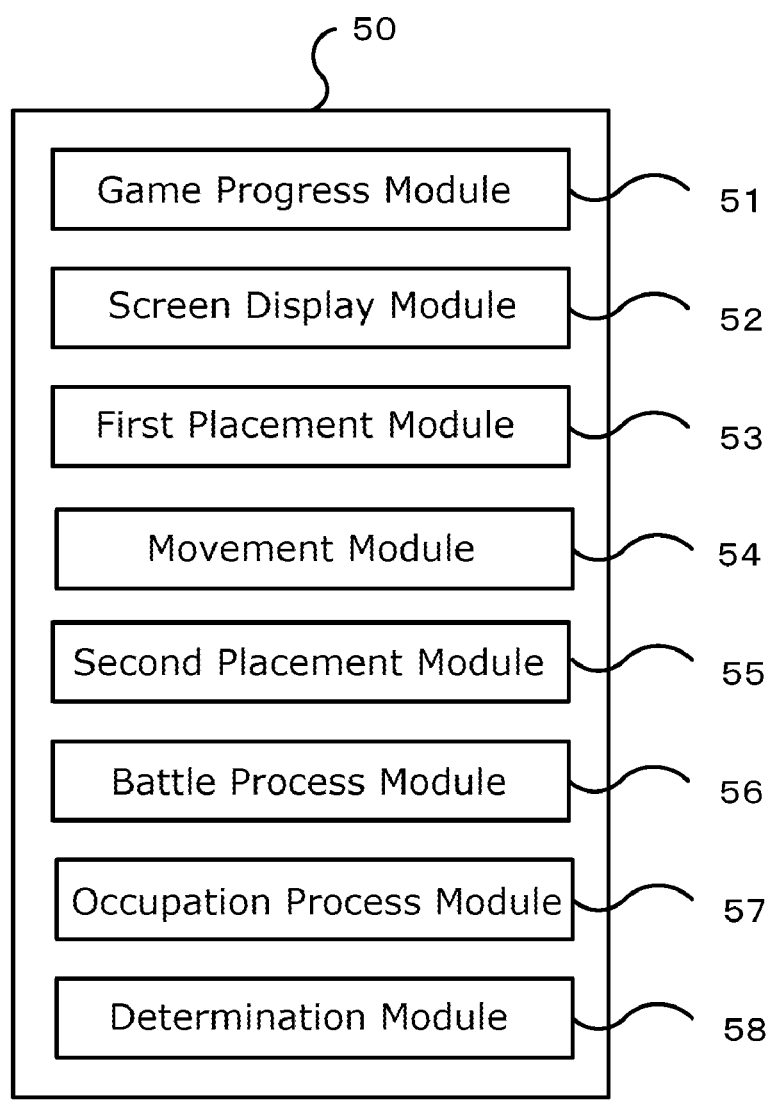
FIG. 2 is a block diagram schematically illustrating a program according to an embodiment of the present invention.

Next, an interactive-game program 50 will be described, which is executed by the CPU 11 of the server 10 according to an embodiment. The interactive-game program 50 may be stored on the external memory 15 and executed to provide an interactive game wherein a first player and a second player battle with each other by using characters moving on a route, among various games that are stored on the external memory 15 and can be provided by the server 10. FIG. 2 is a block diagram schematically illustrating an interactive-game program 50 according to an embodiment. As shown, the interactive-game program 50 may comprise: a game progress module 51 configured to control the progress of the entire interactive game; a screen display module 52 configured to display a game screen on display devices (the user I/F 33 of the terminal devices) of a first player and a second player in accordance with progress of the interactive game, the game screen including at least a part of a route area having a plurality of routes each provided with bases of the first player and the second player; a first placement module 53 configured to place one or more characters selected by the players from a plurality of characters selectable to the players, on one or more routes selected by the players from the plurality of routes, before a predetermined starting condition is satisfied; a movement module 54 configured to move the characters placed on the routes toward the bases of the opponent along the routes after the predetermined starting condition is satisfied; a second placement module 55 configured to place one or more characters selected by the players from a plurality of characters selectable to the players, on one or more routes selected by the players from the plurality of routes, after the predetermined starting condition is satisfied; a battle process module 56 configured to perform a battle process when a distance between the character of the first player and the character of the second player on the route falls within a predetermined range, resume the movement of the character winning in the battle process toward the base of the opponent, and stop the movement of the character losing in the battle process toward the base of the opponent; an occupation process module 57 configured to perform an occupation process for the characters reaching the bases of the opponent to occupy the bases; and a determination module 58 configured to determine a result of the interactive game based at least on the characters reaching and occupying the bases of the opponent. When the CPU 11 executes the interactive-game program 50, the server 10 according to an embodiment can serve as means or units corresponding to the functions of the modules of the interactive game program 50.

FIG. 3 and FIG. 4 show examples of information managed by the character management table and the base management table formed in the external memory 15, etc. of the server 10. As shown in FIG. 3, the character management table according to an embodiment may manage "game field ID" identifying a game field (stage) where an interactive game is performed, "player ID" identifying a player, and "character ID" identifying a character that can be selected in the above game field by the above player; and the character management table may also manage, in association with the combination of the above information, information such as "HP" (hit point) of the character, "cost" of the character, "character attribute" indicating the attribute (type) of the character, "offense power" of the character, "attack range" indicating the range of the character for attacking an opponent character (the range of distance wherein an attack is possible), and "moving power" indicating the moving power (moving speed) of the character. The "HP" may be a parameter that may be set to a predetermined initial value at start of an interactive game and reduced or increased in accordance with the progression of the interactive game after the interactive game is started. In an embodiment, the "cost" may be a parameter for restricting the number of characters that can be placed on the routes in one play of the interactive game. This parameter will be described later. The "character attribute" may be set to a value representing, e.g., "spearman," "cavalryman," "bowman," "infantryman," and "corpsman"; and at least part of the above parameters "HP," "cost," "offense power" "attack range," and "moving power" may be set in accordance with the "character attribute" (for example, "cavalryman" is superior to "infantryman" in "moving power" (capable of moving faster); and "bowman" is superior to "spearman" in "attack range" (capable of attacking over a larger distance)). Further, in an embodiment, characters selectable to individual players are predetermined for each game field. Instead of predetermining the characters selectable to players for each game field, the server 10 may manage, for each player, characters obtained through a purchase or lottery (gasha) and owned by the player and may use the characters owned by the player as selectable characters in the interactive game.

As shown in FIG. 4, the base management table in an embodiment may manage "game field ID" identifying a game field, "player ID" identifying a player, and "base ID" identifying a base of the above player in the above game field; and the base management table may also manage, in association with the combination of the above information, information such as "HP" (hit point) of the base and "defense power" of the base. The "HP" may be a parameter that may be set to a predetermined initial value at start of an interactive game and reduced or increased in accordance with the progression of the interactive game after the interactive game is started.

Figure 5:
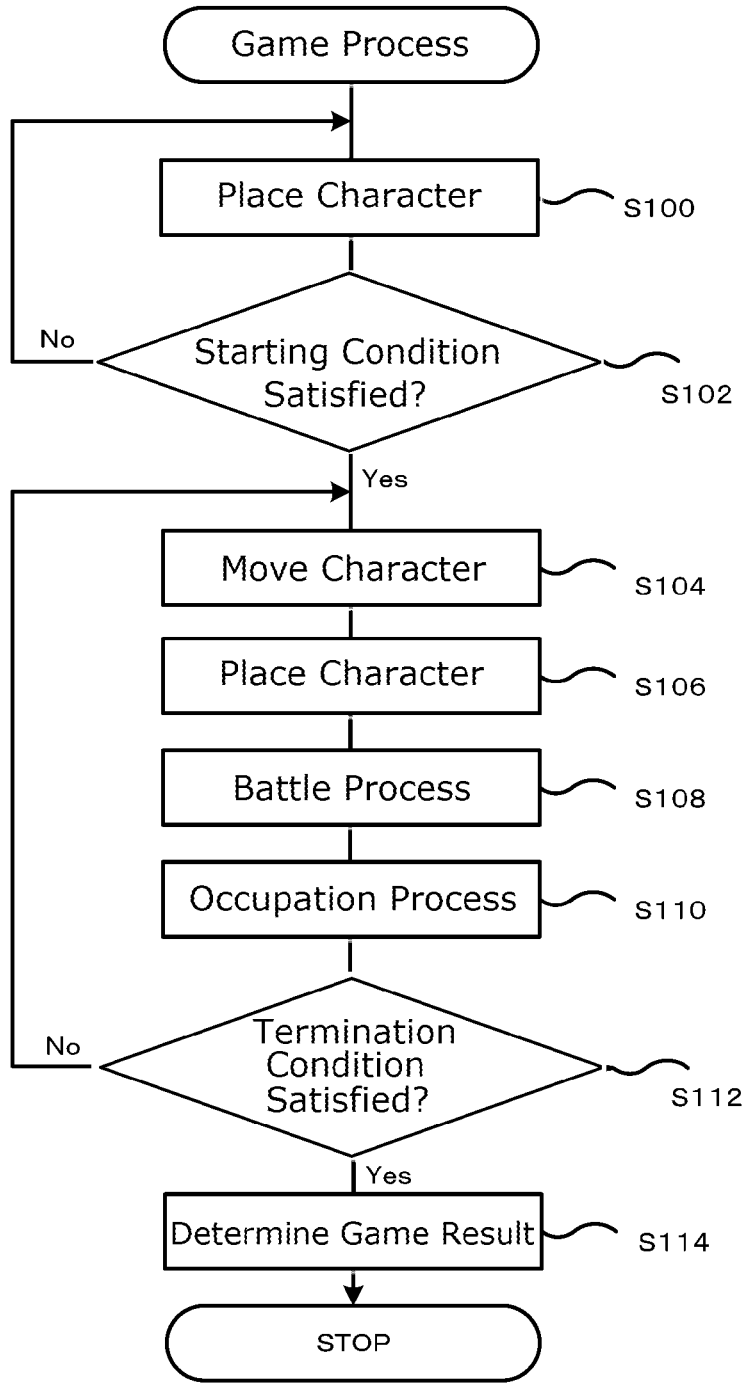
FIG. 5 is a flow diagram showing an example of a game process according to an embodiment.

Next, operations of such a server 10 according to an embodiment will now be described. FIG. 5 is a flow diagram showing an example of a game process performed by the server 10 according to an embodiment to start the above interactive game using the characters moving on a route. The interactive game may be started when, for example, the server 10 receives entry into the interactive game from a plurality of players through a web page providing the interactive game; the combination of the first player and the second player among the plurality of players whose entry is received is specified by a predetermined rule and notified to each player; and the first player and the second player give instructions for the start of the interactive game. A plurality of game fields having different difficulty levels may be prepared as the game fields of the interactive game; and the player may designate the difficulty level of the game field when sending the entry into the interactive game. Thus, for example, the interactive game can be performed between players who desire the same difficulty level. Further, at least one of the first player and the second player battling with each other may be a player operated by a computer (server 10).

Figure 6:
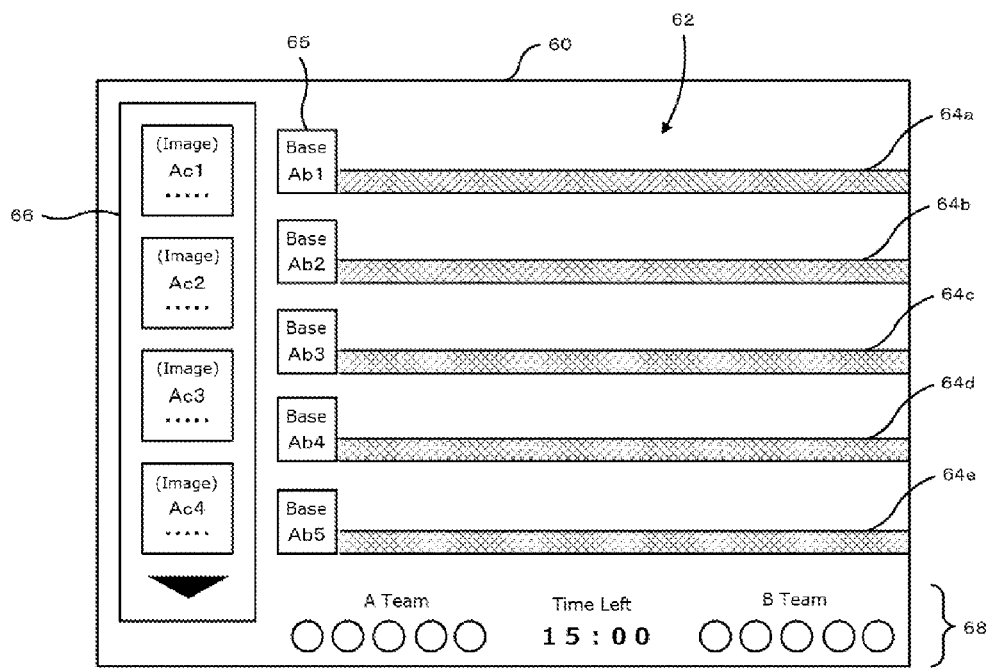
FIG. 6 is a diagram showing an example of game screen 60 according to an embodiment.

The outline of the interactive game provided by the server 10 according to an embodiment will now be described. In the interactive game according to an embodiment, the bases of the players may be positioned at both ends of a plurality of linear routes; and the basic game target may be to move characters placed on the routes from the player's own bases to the opponent's bases thereby to occupy the opponent's bases. The characters placed on the routes may be moved along the linear routes and cannot be transferred to other routes. FIG. 6 shows an example of the game screen 60 for providing an interactive game displayed on the terminal device 30 when the server 10 executes the screen display module 52. As shown, the game screen 60 according to an embodiment may contain a route display section 62 displaying at least a part of a route area having a plurality of routes 64a-64e (hereinafter collectively referred to as routes 64), a character display section 66 positioned at the left end of the screen and displaying a list of characters selectable to the player, and a progress display section 68 positioned at the bottom of the screen and displaying the progress of the game. The game screen 60 shown in FIG. 6 may be displayed on the terminal device 30 of one of the players at the start of the interactive game, wherein the route display section 62 may display a part of the route area such that only the bases 65 of the player himself operating the terminal device 30 are displayed and the bases 65 of the opponent are hidden. In this example, the bases 65 are positioned at both ends of the linear routes 64 extending horizontally; alternatively, it may also be possible to position the bases 65 at the both ends of linear routes 64 extending vertically. The character display section 66 may display a list of information related to the characters such as icon images corresponding to the characters and various information (e.g., parameters such as "offense power" managed by the character management table). As shown, the progress display section 68 may display information on game progress such as the occupation of the bases 65 by the players (represented by circles in FIG. 6) and the remaining time of the interactive game.

Figure 7:
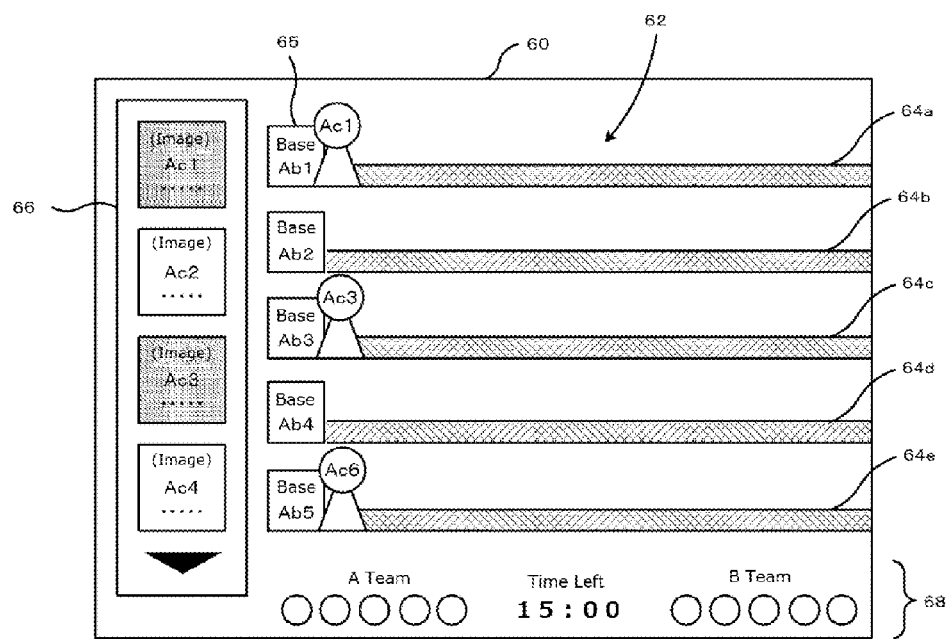
FIG. 7 is a diagram showing an example of game screen 60 according to an embodiment.

Referring back to the flow diagram of FIG. 5, the first step of the game process may be to place the characters selected by the players on the selected routes (step S100). This step may be performed when the server 10 executes the first placement module 53. More specifically, a player may select a desired character from a plurality of selectable character displayed in the character display section 66 of the game screen 60 shown in FIG. 6; and the player may select a desired route 64 from a plurality of routes 64 displayed in the route display section 62; then, the selected character may be placed at the player's base 65 on the selected route 64. In an embodiment, step S100 may have a time limit for placement of the characters and the predetermined minimum number of characters to be placed. That is, the players are required to place the minimum number (e.g., 3) or more of characters (at the bases 65) on any of the routes within the time limit (e.g., 30 seconds). The time limit and/or minimum number of characters to be placed may be varied for each game field. FIG. 7 shows an example of game screen 60 wherein characters are placed at the bases 65 in accordance with the selection by the player. As shown in this example, among the plurality of characters selectable to the player, a character "Ac1" is placed at the base "Ab1"; a character "Ac3" is placed at the base "Ab3"; and a character "Ac6" is placed at the base "Ab5." Further, as shown, the character display section 66 is in such a display mode that the player can perceive the characters placed on the routes (e.g., the display mode wherein placed characters are grayed out). As described above, the bases 65 of the opponent may not be displayed in the route display section 62 of the game screen 60 at the start of the interactive game; therefore, the players are required to place the minimum number of characters at the player's own bases 65 within the time limit while predicting the placement of the characters on the routes by the opponent. In an embodiment, if the number of placed characters is less than the minimum number when the above time limit has elapsed, the server 10 may select characters automatically (under a predetermined rule) and place the selected characters on the routes selected also automatically (under a predetermined rule) so as to place the minimum number of characters.

Figure 8:
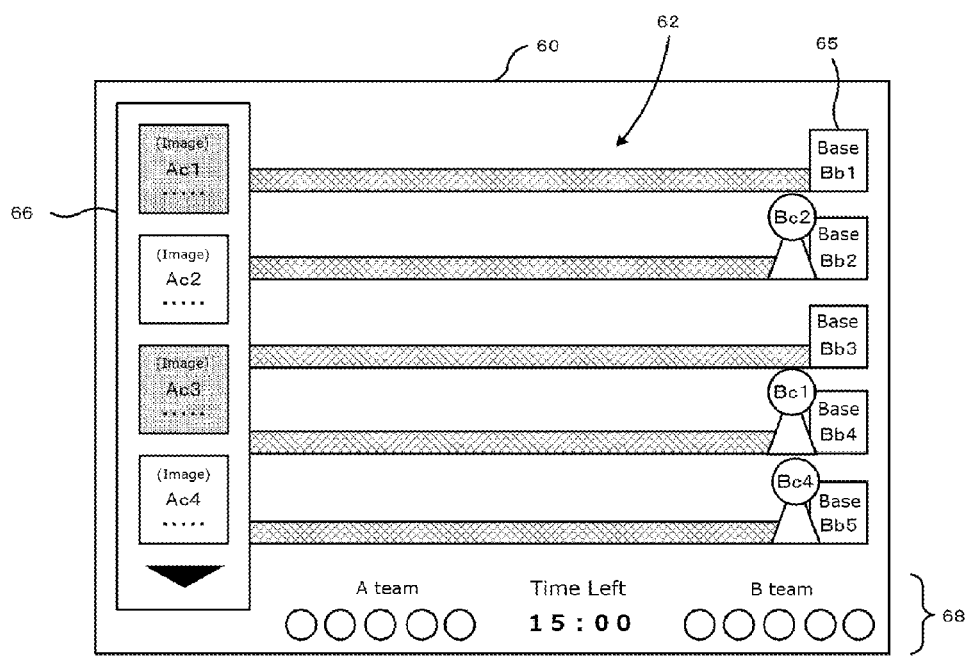
FIG. 8 is a diagram showing an example of game screen 60 according to an embodiment.

After a predetermined starting condition is satisfied (step S102), the server 10 may repeat the processes of moving the characters placed on the routes (step S104), placing additional characters (step S106), battle between characters (step S108), and occupation of the bases by the characters (step S110) until a predetermined termination condition is satisfied (step S112). In the flow diagram of FIG. 5, the steps S104 to S110 are sequentially arranged for convenience; but these steps are performed substantially in parallel. In an embodiment, the predetermined starting condition may be that the time limit for placing the characters elapses or that both players confirm placement of the minimum number or more of characters. That is, when the time limit for placing the characters has elapsed or when both players has confirmed placement of the minimum number of more of characters, the server 10 may repeatedly perform the steps S104 to S110. As described above, the bases 65 of the opponent are not displayed in the route display section 62 of the game screen 60 at start of the interactive game. However, after the predetermined starting condition is satisfied (i.e., while the steps S104 to S110 are repeatedly performed), a part of the route area including the bases 65 of the opponent may be displayed in the route display section 62 in response to a request from a player (e.g., in response to a flick operation on the game screen 60). FIG. 8 shows an example of the game screen 60 wherein a part of the route area including the bases 65 of the opponent is displayed in the route display section 62. As shown, since the part including the bases 65 of the opponent is displayed, the player can grasp the placement of the characters by the opponent. When the predetermined starting condition is satisfied, the route display section 62 of the game screen 60 may display the part of the route area including the bases 65 of the opponent, irrespective of whether there is a request from a player, so as to prompt the player to confirm the placement of the characters by the opponents.

The operation of moving the characters placed on the routes (step S104) may be performed when the server 10 executes the movement module 54. More specifically, a character is moved toward a base 65 of the opponent at a moving speed depending on the "moving power" of the character.

Placement of the characters (step S106) may be performed when the server 10 executes the second placement module 55. More specifically, as in the placement of a character in the step S100 described above, the player may select a desired character from a plurality of selectable characters displayed in the character display section 66 of the game screen 60; and the player may select a desired route 64 from a plurality of routes 64 displayed in the route display section 62; then, the selected character may be placed at the player's base 65 on the selected route 64.

In an embodiment, the number of characters that can be placed on the routes in one play of the interactive game may be restricted based on the "costs" assigned to the characters, as described above. More specifically, the total of the "costs" of the characters placed on the routes in one play of the interactive game may be restricted by a predetermined upper limit; and when the upper limit is exceeded (when a predetermined stop condition is satisfied), no characters can be placed additionally. For example, if characters with high power (e.g., "offense power," "attack range," or "moving power") have large "costs" assigned thereto, only a small number of such characters can be placed. Therefore, a player is required to place the characters in view of the "costs" assigned to the characters. This may enhance the strategic characteristics of the interactive game. The above upper limit may be varied for each game field. For example, if each of the game fields have a different number of routes or a different "HP" of the bases 65 assigned thereto, game fields having a larger number of routes (i.e., a larger number of bases) or a larger "HP" of the bases 65 may require a larger number of characters to be placed therein and thus should preferably have a higher upper limit of the total of the "costs."

Figure 9:
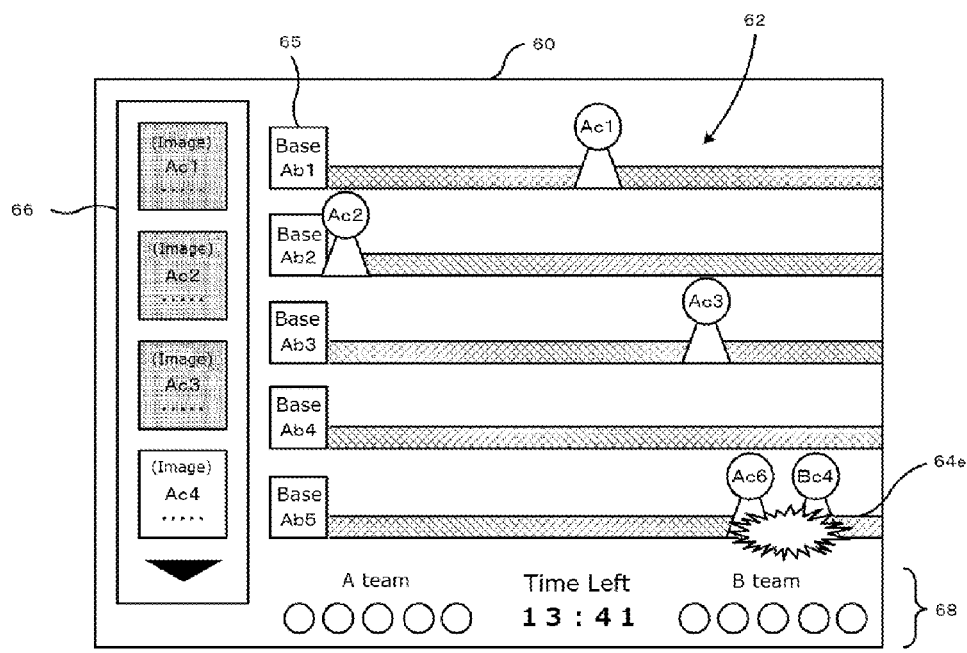
FIG. 9 is a diagram showing an example of game screen 60 according to an embodiment.

The battle process between characters (step S108) may be performed by the server 10 executing the battle process module 56 when the distance between the characters on a route falls within a predetermined range. More specifically, the battle process between the characters may be performed when, as a result of movement of the characters placed on the route, the distance between the characters on the route falls within the "attack range" of at least one of the characters (e.g., the character "Ac6" and the character "Bc4" on the route 64e in FIG. 9). The battle process may be performed with various rules applied for deciding a winner and a loser. For example, such rules may be based on parameters assigned to the characters. More specifically, the applied rule may be as follows: the damage on an opponent character may be calculated based on the "offense power" assigned to a character (e.g., the calculated damage may be larger as the "offense power" of the character is larger); and the calculated damage may be subtracted from the "HP" of the opponent character; this process may be repeated alternately between the characters until the "HP" of either character becomes zero, when the server 10 may decide that the character having "HP" of zero is a loser and the other character is a winner. Also, the applied rule may be based on a combination of "character attributes" between the characters. For example, when the "character attributes" combined are "spearman" and "cavalryman," the above damage may be calculated advantageously to the "spearman" (e.g., the damage calculated when the "spearman" attacks the "cavalryman" may be double the normal damage). Thus, a player can progress the game advantageously by placing a character having an advantageous "character attribute" over an opponent character on the same route as the opponent character. This may enhance the strategic characteristics of the interactive game. In an embodiment, when the distance between characters on a route is within the "attack range" of one of the characters but is outside the "attack range" of the other, only the former character may start an attack, and then (e.g., when a predetermined amount of time has elapsed or when a predetermined number of attacks have been done) the characters alternately attack each other.

Figure 10:
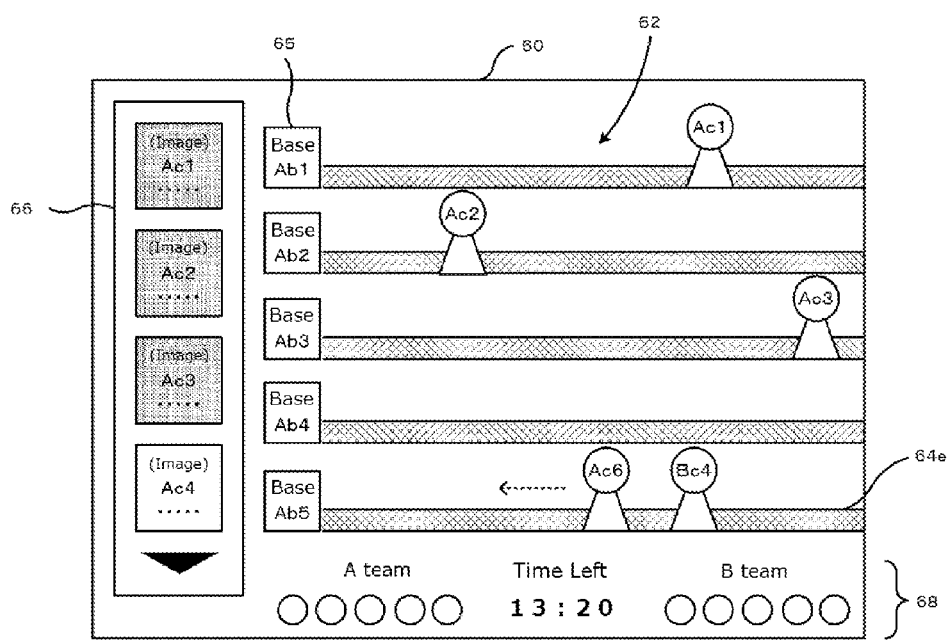
FIG. 10 is a diagram showing an example of game screen 60 according to an embodiment.

In an embodiment, the character winning the battle may resume movement toward the base 65 of the opponent; and the character losing the battle may move (return) to its own base 65 (e.g., the character "Ac6" on the route 64*e* in FIG. 10). The movement of the character losing the battle to its base 65 may be performed by the server 10 executing the movement module 54. In an embodiment, when the character losing the battle reaches its base 65, this character may become selectable to the player and can be placed on a route again. It may also be possible that, when a predetermined amount of time has passed after the character losing the battle reached its base 65 and the character has recovered its "HP," the player should be permitted to place the character on a route again.

Figure 11:
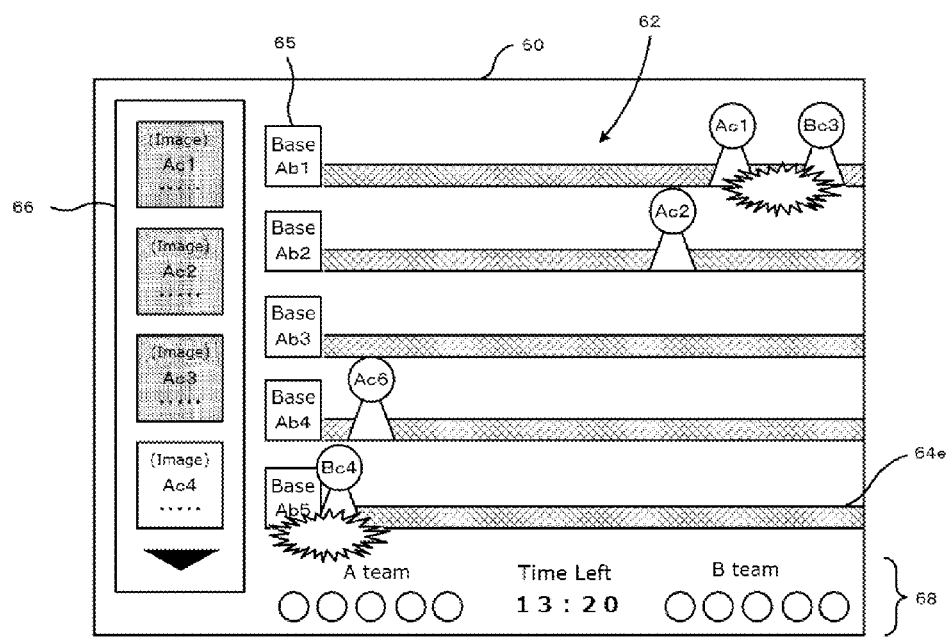
FIG. 11 is a diagram showing an example of game screen 60 according to an embodiment.

The occupation of a base by a character (step S110) may be performed by the server 10 executing the occupation process module 57 when the character reaches the base 65 of the opponent (e.g., the character "Bc4" on the route 64*e* in FIG. 11). The occupation process may be performed with various rules applied for deciding the occupation of the base 65 by the character. For example, such rules may be based on parameters assigned to the characters and the bases 65. More specifically, the applied rule may be as follows: the damage on a base 65 may be calculated based on the "offense power" assigned to a character and the "defense power" assigned to the base 65 (e.g., the calculated damage may be larger as the "offense power" of the character is larger and the "defense power" of the base 65 is smaller); and the calculated damage may be subtracted from the "HP" of the base 65; this process may be repeated until the "HP" of the base 65 becomes zero, when the server 10 may decide that the base 65 is occupied. In an embodiment, the character that has occupied the base 65 may remain (be stationed) at the base 65 and cannot be placed on the route again. Alternatively, a character other than the character that has occupied the base 65 may be stationed in accordance with selection by the player. Meanwhile, when the player has his own base 65 occupied by an opponent character, the player may newly place a character at the base 65 to enter the character in a battle with the stationed character.

Figure 12:
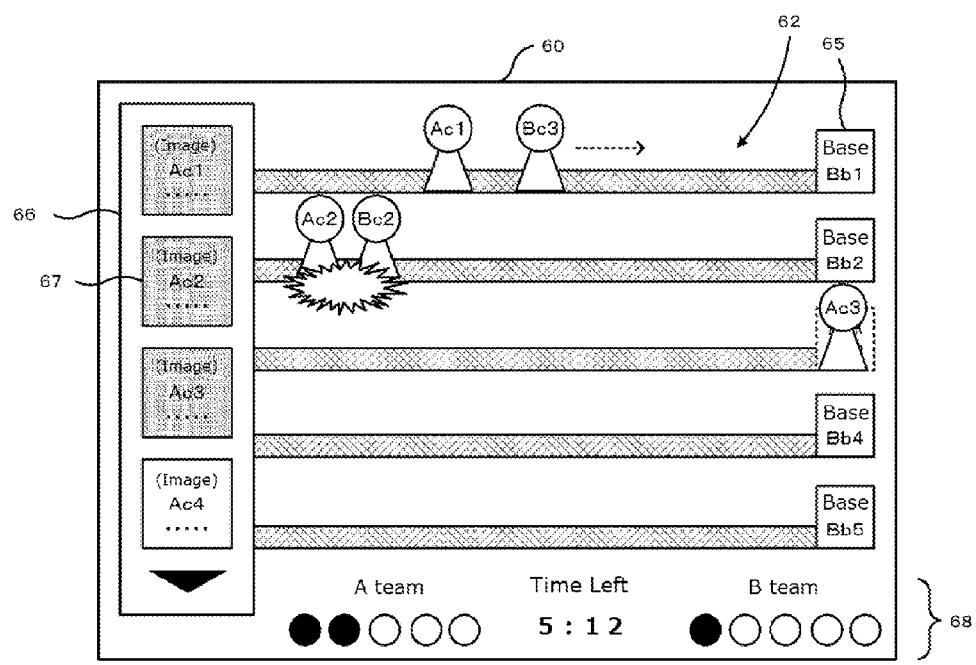
FIG. 12 is a diagram showing an example of game screen 60 according to an embodiment.

Thus, the server 10 may progress the interactive game by repeating the processes of moving the characters placed on the routes (step S104), placing additional characters (step S106), battle between characters (step S108), and occupation of the bases by the characters (step S110). During the progress of the interactive game, a player may confirm what opponent character is placed on the route and place his own character on the route in view of the "character attribute," "offense power," "attack range," and "moving power" of the opponent character. For example, a player may place a character on a route for an advantageous battle in view of combination of "character attributes" between characters or abandon an attempt to occupy a base 65 on which an opponent character having a higher power is placed and concentrate his own characters on routes on which opponent characters having a lower power are placed. FIG. 12 shows an example of game screen 60 where the interactive game has progressed and some bases 65 have been occupied by the characters. As shown, the progress display section 68 of the game screen 60 may display the numbers of occupied bases of his own and the opponent as the bases 65 are occupied by the characters (in this example, an occupied base 65 is represented as a black-filled circle).

When the predetermined termination condition is satisfied (step S112), the server 10 may determine the game result (step S114) and terminate the game process. The predetermined termination condition may be, for example, that a predetermined game period (e.g., 15 minutes) has elapsed and/or that one of the players has occupied a predetermined number of bases 65 (e.g., more than half) among the bases 65 of the opponent. The determination of the game result may be performed by the server 10 executing the determination module 58 with various rules applied for deciding a winner and a loser of the interactive game. For example, the applied rule may be as follows: the player who has first occupied a predetermined number of bases 65 of the opponent is the winner; the player who occupies more bases 65 of the opponent at the termination of the game is the winner; or the player who has a larger total of "HP" of his own bases 65 at the termination of the game is the winner. The winning player may be provided with a right to play the interactive game in a game field of a higher difficulty level.

In the interactive game provided by the server 10 according to the above embodiment, the character moved to the base 65 of the opponent may be moved (withdrawn) to the player's own base 65 in response to a request from the player. Thus, the player is required to decide to withdraw the character in accordance with the placement of the opponent character on the same route and the situation of occupation of the bases 65. This may enhance the strategic characteristics of the interactive game. Further, the player may exercise special skills for advantageously progressing the game by using various items or special characters. Examples of the special skills may include a skill for recovering "HP" of a character or a base 65. The skills may be exercised for a limited number of times. Thus, the player may be required to consider the timing to exercise the skill. This may enhance the strategic characteristics of the interactive game. Additionally, the number of characters that can be simultaneously placed on one route by one player may be either restricted to one or allowed to be any plural number without restriction.

In the server 10 according to the embodiment described above, characters may be placed on the routes in accordance with selection by the players before a predetermined starting condition is satisfied; and after the predetermined starting condition is satisfied, the characters placed on the routes may be moved toward the bases of the opponent, and other characters are placed on the routes in accordance with selection by the players; when the distance between the characters on a route falls within a predetermined range, a battle process may be performed; the character winning in the battle process may resume movement toward the base 65 of the opponent, and the losing character may be stopped from moving toward the base of the opponent and the result of the interactive game may be determined based at least on the characters reaching the bases of the opponent. Accordingly, the provided interactive game may include both offense game element of causing the player's own characters to reach the bases of the opponent and defense game element of preventing the opponent's characters from reaching the bases of the player's own bases. Further, the characters can be placed on the routes both before and after a predetermined starting condition is satisfied; therefore, the player may be required to consider both the placement of the characters before the characters start moving and the placement of the characters in accordance with progress of the interactive game (the situation of the battle process and the situation of the occupation process) after the characters start moving. As a result, the provided interactive game using characters moving on the routes may require more strategic characteristics.

Further, in the interactive game provided by the server 10 according to an embodiment, a time limit and the minimum number of characters to be placed may be set for placement of characters before a predetermined starting condition is satisfied; therefore, a player is required to place the minimum number or more of characters within the time limit. Additionally, since the characters placed on the routes cannot be transferred to other routes, the player may feel thrilling playability.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server for providing an interactive game between a first player and a second player, the server comprising:
    a central processing unit configure to execute computer programs;
    memory storage configured to store machine-readable instructions, the machine readable instructions, when executed, causing the central processor to execute the interactive game such that the interactive game is provided to terminal devices of the first and second players, providing the interactive game to the terminal devices comprising:
    displaying a game screen on the terminal devices of the first player and the second player in accordance with progress of the interactive game, the game screen including at least a part of a route area having a plurality of routes each provided with bases of the first player and the second player, wherein movement from one route to another is impossible;
    placing one or more characters selected by the players from a plurality of characters selectable to the players, on one or more routes selected by the players from the plurality of routes within a predetermined time limit, before a predetermined starting condition is satisfied, wherein the predetermined starting condition includes at least a condition that the predetermined time limit has elapsed;
    moving the characters placed on the routes toward the bases of the opponent along the routes after the predetermined starting condition is satisfied;
    placing one or more characters selected by the players from a plurality of characters selectable to the players, on one or more routes selected by the players from the plurality of routes, after the predetermined starting condition is satisfied;
    performing a battle process when a distance between the character of the first player and the character of the second player on the route falls within a predetermined range, resuming the movement of the character winning in the battle process toward the base of the opponent, and stopping the movement of the character losing in the battle process toward the base of the opponent; and
    determining a result of the interactive game based at least on the characters reaching the bases of the opponent.

2. The server of claim 1 wherein the game screen is displayed so as to hide the characters placed on the routes by the opponent until the predetermined starting condition is satisfied.

3. The server of claim 2 wherein the game screen including a part of the route area corresponding to a request from the players is displayed after the predetermined starting condition is satisfied.

4. The server of claim 1 wherein each of the players places a predetermined number or more of the characters on the routes before the predetermined starting condition is satisfied.

5. The server of claim 1 wherein providing the interactive game to the terminal devices further includes stopping placing the characters on the routes when a predetermined stop condition based on the characters placed on the routes is satisfied.

6. The server of claim 1 wherein the characters is placed at the first and/or the second player's own bases on the routes.

7. The server of claim 1 wherein providing the interactive game to the terminal devices further comprises moving, to the first and/or the second player's own base, the character losing in the battle process and stopped from moving toward the base of the opponent.

8. The server of claim 7 wherein providing the interactive game to the terminal devices further comprises placing the character reaching the first and/or the second player's own base on the routes.

9. The server of claim 1, wherein providing the interactive game to the terminal devices further comprises:
    performing an occupation process for the characters reaching the bases of the opponent to occupy the bases, wherein
    determining a result of the interactive game based at least on the characters occupying the bases of the opponent.

10. A non-transitory computer-readable storage medium storing a program for causing one or more computers to serve as a system for providing an interactive game between a first player and a second player, the program causing the computers to execute the interactive game such that the interactive game is provided to terminal devices of the first and second players, providing the interactive game to the terminal devices comprising:
    displaying display a game screen on the terminal devices of the first player and the second player in accordance with progress of the interactive game, the game screen including at least a part of a route area having a plurality of routes each provided with bases of the first player and the second player, wherein movement from one route to another is impossible;
    placing one or more characters selected by the players from a plurality of characters selectable to the players, on one or more routes selected by the players from the plurality of routes within a predetermined time limit, before a predetermined starting condition is satisfied, wherein the predetermined starting condition includes at least a condition that the predetermined time limit has elapsed;

moving the characters placed on the routes toward the bases of the opponent along the routes after the predetermined starting condition is satisfied;

placing one or more characters selected by the players from a plurality of characters selectable to the players, on one or more routes selected by the players from the plurality of routes, after the predetermined starting condition is satisfied;

performing a battle process when a distance between the character of the first player and the character of the second player on the route falls within a predetermined range, resume the movement of the character winning in the battle process toward the base of the opponent, and stop the movement of the character losing in the battle process toward the base of the opponent; and determining a result of the interactive game based at least on the characters reaching the bases of the opponent.

11. A method for one or more computers to provide an interactive game between a first player and a second player, the method comprising:

electronically executing the interactive game at a server having a central processor and memory storage such that the interactive game is provided to terminal devices of the first and second players from the server, providing the interactive game to the terminal devices from the server comprising:

displaying a game screen on the terminal devices of the first player and the second player in accordance with progress of the interactive game, the game screen including at least a part of a route area having a plurality of routes each provided with bases of the first player and the second player, wherein movement from one route to another is impossible;

placing one or more characters selected by the players from a plurality of characters selectable to the players, on one or more routes selected by the players from the plurality of routes, before a predetermined starting condition is satisfied;

moving the characters placed on the routes toward the bases of the opponent along the routes after the predetermined starting condition is satisfied;

placing one or more characters selected by the players from a plurality of characters selectable to the players, on one or more routes selected by the players from the plurality of routes within a predetermined time limit, after the predetermined starting condition is satisfied, wherein the predetermined starting condition includes at least a condition that the predetermined time limit has elapsed;

performing a battle process when a distance between the character of the first player and the character of the second player on the route falls within a predetermined range, resume the movement of the character winning in the battle process toward the base of the opponent, and stop the movement of the character losing in the battle process toward the base of the opponent; and determining a result of the interactive game based at least on the characters reaching the bases of the opponent.

\* \* \* \* \*